(12) United States Patent
Wu

(10) Patent No.: US 9,152,028 B2
(45) Date of Patent: Oct. 6, 2015

(54) LASER PROJECTION DEVICE WITH SPLITTERS SPACED FROM EACH OTHER

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 148 days.

(21) Appl. No.: 13/893,355

(22) Filed: May 14, 2013

(65) Prior Publication Data

US 2014/0176913 A1    Jun. 26, 2014

(30) Foreign Application Priority Data

Dec. 21, 2012    (TW) .............................. 101148937 A

(51) Int. Cl.
G03B 21/00    (2006.01)
G03B 21/20    (2006.01)
G03B 33/12    (2006.01)

(52) U.S. Cl.
CPC ........ *G03B 21/2033* (2013.01); *G03B 21/2066* (2013.01); *G03B 33/12* (2013.01)

(58) Field of Classification Search
CPC .. G03B 21/208; G03B 33/12; G03B 21/2033; G02B 19/0057; G02B 5/0066; G02B 5/188; G02B 5/26; G02B 27/141; H01S 5/4093
USPC ........................................................... 353/31
See application file for complete search history.

(56) References Cited

U.S. PATENT DOCUMENTS

| 5,900,982 A * | 5/1999 | Dolgoff et al. ................ 359/619 |
| 2006/0044556 A1 * | 3/2006 | Kawano ........................ 356/317 |
| 2013/0021581 A1 * | 1/2013 | Takahashi et al. ............. 353/31 |

* cited by examiner

*Primary Examiner* — Sultan Chowdhury
*Assistant Examiner* — Danell L Owens
(74) *Attorney, Agent, or Firm* — Novak Druce Connolly Bove + Quigg LLP

(57) ABSTRACT

An exemplary laser projection device includes a substrate, three laser chips mounted on the substrate, and a spectroscope arranged on laser beams paths of the laser chips. Each laser chip is a laser diode. The spectroscope includes a first group of splitters, and a second group of splitters spaced from the first group of splitters. Laser beams emitted from the laser chips are adjusted into the second group of splitters by the first group of splitters. And then, the laser beams adjusted into the second group of splitters are adjusted to be oriented toward the same direction and mixed together to obtain light of a predetermined color.

5 Claims, 2 Drawing Sheets

LASER PROJECTION DEVICE WITH SPLITTERS SPACED FROM EACH OTHER

BACKGROUND

1. Technical Field

The disclosure generally relates to projection devices and more particularly to a laser projection device.

2. Description of Related Art

Laser projection devices are more and more popular for its projected images having a lager color gamut, a higher brightness, an increased contrast and a better saturation.

A conventional laser projection device includes a red light emitting diode (LED) package, a green LED package, a blue LED package, a spectroscope arranged on light paths of the LED packages and a photoelectric conversion device. The spectroscope includes a first beam splitter, a second beam splitter, and a third beam splitter. The three beam splitters are corresponding with the three LED packages respectively. Light emitted from the LED packages directly radiates to the spectroscope and then is reflected by the spectroscope to mix. And then, the mixed light can be modulated into images on a screen by the photoelectric conversion device.

In order to reduce the bulk of the projection laser device, the three LED packages are usually mounted on a substrate, and the space between two adjacent LED packages is reduced. Because the space between two adjacent LED packages is reduced, the corresponding beam splitters need to be thinner and thinner, or the beams emitted from the LED packages can not radiated to the corresponding beam splitters. However, the thinner beam splitters are too frangible to be assembled easily, which results in the assembling efficiency of the laser projection device being reduced.

What is needed, therefore, is an improved laser projection device which can overcome the above described shortcomings.

DETAILED DESCRIPTION

Embodiment of laser projection device will now be described in detail below and with reference to the drawings.

Figure 1:
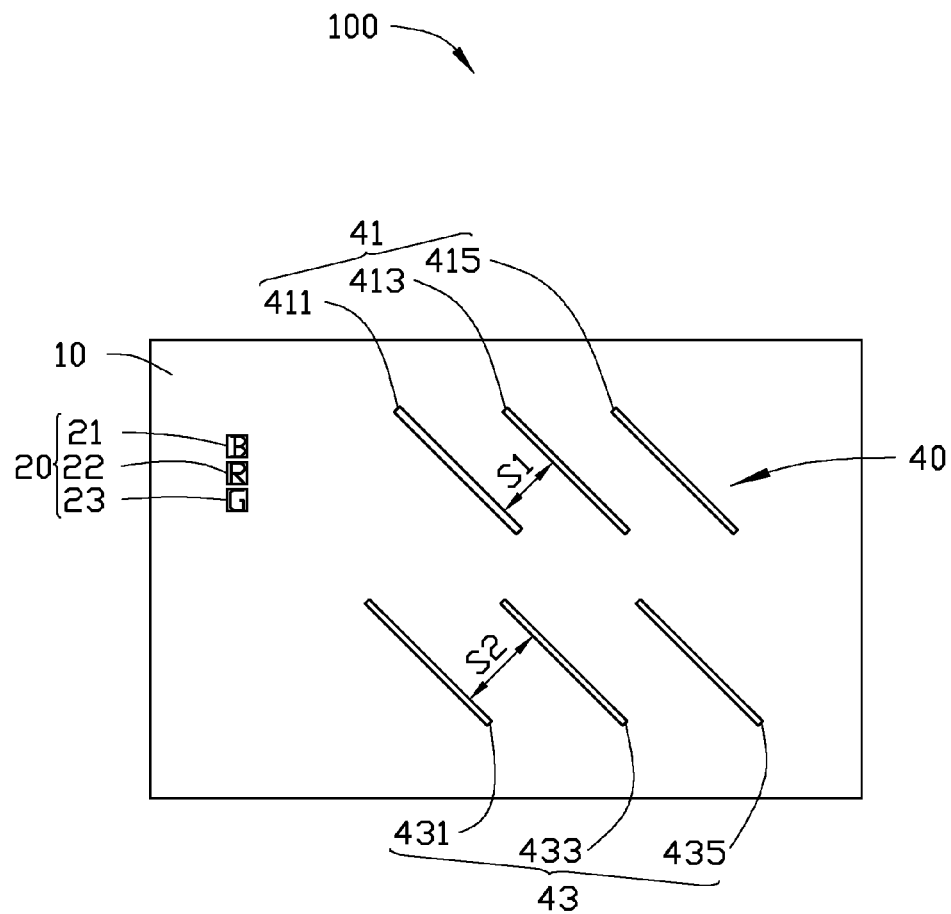
FIG. 1 is a top plan view of a laser projection device according to an embodiment.

Referring to FIG. 1, a laser projection device 100 according to an embodiment of the present disclosure includes a substrate 10, a light source 20 and a spectroscope 40. The light source 20 and the spectroscope 40 are mounted on the substrate 10. The spectroscope 40 is arranged on light paths of lights emitted from the light source 20.

The substrate 10 is flat. The light source 20 and the spectroscope 40 are arranged on a top surface of the substrate 10 in sequence along a longitudinal direction of the substrate 10. A circuit (not shown) is arranged on the top surface of the substrate 10. In this embodiment, the substrate 10 is made of electrically insulating materials, such as silicone, epoxy.

The light source 20 includes a plurality of laser chips. The laser chips are electrically connected to the circuit on the top surface of the substrate 10. A brightness of each laser chip can be controlled by a current through the circuit. The light source 20 is used to emit laser beams with colors needed.

The light source 20 includes a first laser chip 21, a second laser chip 22 and a third laser chip 23. Each of the laser chips 21, 22, 23 is a laser diode. The laser chips 21, 22, 23 are spaced from each other, and are arranged in a line along a transverse direction of the substrate 10. Alternatively, the arranged direction and the arranged sequence of the laser chips 21, 22, 23 are not limited as described-above. In this embodiment, the first laser chip 21 is a blue laser chip, the second laser chip 22 is a red laser chip, and the third laser chip 23 is a green laser chip.

The spectroscope 40 is spaced from the light source 20, and is located on the light paths of the light source 20. The laser beams emitted from the laser chips 21, 22, 23 are adjusted by the spectroscope 40 to be oriented toward the same direction and mixed together to obtain light of a predetermined color which usually is white.

The spectroscope 40 includes a first group of splitters 41 and a second group of splitters 43.

The first group of splitters 41 and the second group of splitters 43 are spaced from each other, and are arranged along a transverse direction of the substrate 10. The first group of splitters 41 is aligned with the laser chips 21, 22, 23 along a longitudinal direction of the substrate 10.

The first group of splitters 41 includes a first blue beam splitter 411, a first red beam splitter 413 and a first green beam splitter 415. The first beam splitters 411, 413, 415 are parallel to and spaced from each other. The first splitters 411, 413, 415 are sequentially arranged in a row along a longitudinal direction of the substrate 10. The first beam splitters 411, 413, 415 are slantwise and have top ends thereof oriented toward the light source 20. An angle is defined between each of the first beam splitters 411, 413, 415 and a top end of the substrate 10. The angle is varied between 10° to 45°. In this embodiment, a space between two adjacent first beam splitters is S1 (shown in FIG. 1).

The first blue beam splitter 411 may reflect the blue laser beams and laser beams whose wavelength is near the wavelength of blue laser beams, but allows laser beams with other wavelength to pass through. The first red beam splitter 413 may reflect the red laser beams and laser beams whose wavelength is near the wavelength of red laser beams, but allows laser beams with other wavelength to pass through. The first green beam splitter 415 may reflect the green laser beams and laser beams whose wavelength is near the wavelength of the green laser beams, but allows laser beams with other wavelength to pass through.

Similar to the first group of splitters 41, the second group of splitters 43 includes a second blue beam splitter 431, a second red beam splitter 433 and a second green beam splitter 435. The second blue beam splitter 431 has a same size, a same shape and a same function to the first blue beam splitter 411. The second red beam splitter 433 has a same size, a same shape and a same function to the first red beam splitter 413. The second green beam splitter 435 has a same size, a same shape and a same function to the first green beam splitter 415.

The second beam splitters 431, 433, 435 are spaced from each other, and are sequentially arranged in a row along a longitudinal direction of the substrate 10. A space between two adjacent second beam splitters is S2 (shown in FIG. 1).

Furthermore, the second blue beam splitter 431 is aligned with the first blue beam splitter 411 along a transverse direction of the substrate 10, and is parallel to the first blue beam splitter 411. The second red beam splitter 433 is aligned with the first red beam splitter 413 along a transverse direction of the substrate 10, and is parallel to the first red beam splitter 413. The second green beam splitter 435 is aligned with the first green beam splitter 415, and is parallel to the first green beam splitter 415.

In this embodiment, the space S2 is larger than the space S1. Alternatively, the arranged sequence and the position of the first beam splitters 411, 413, 415 and the second beam splitters 431, 433, 435 can be regulated with the arranged sequence and the position of the laser chips 21, 22, 23.

Figure 2:
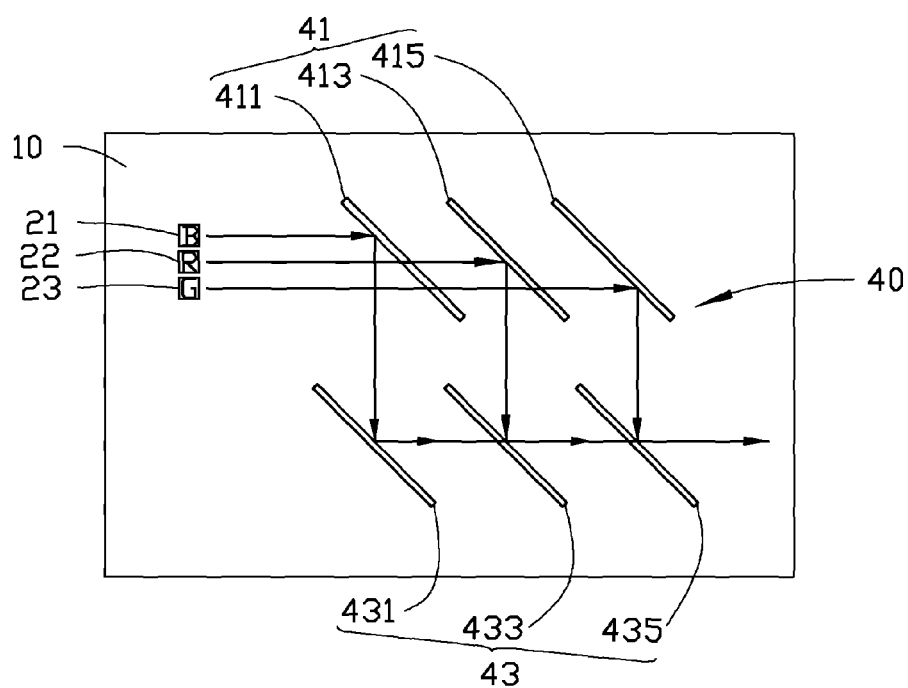
FIG. 2 is a schematic view showing light paths of the laser projection device of FIG. 1.

Referring to FIG. 2, when the laser projection device 100 works, the blue laser beams emitted from the blue laser chip 21 are reflected into the corresponding second blue beam splitter 431 by the first blue beam splitter 411, and then, the blue laser beams are reflected by the second beam splitter 431 to pass through the second red and green beam splitters 433, 435 sequentially.

Similarly, the red laser beams emitted from the red laser chip 22 are passing through the first blue beam splitter 411, and are emitting into the first red beam splitter 413. Then, the red laser beams are reflected into the corresponding second red beam splitter 433 by the first red beam splitter 413, and then, the red laser beams are reflected by the second red beam splitter 433 to pass through the second green beam splitter 435.

The green laser beams emitted from the green laser chip 23 are passing through the first blue beam splitter 411 and the first red beam splitter 413 sequentially, and are emitting into the first green beam splitter 415. Then, the green laser beams are reflected into the second green beam splitter 435 by the first green beam splitter 415, and then, the green laser beams are reflected by the second green beam splitter 435 to mix with the blue laser beams passing through the second red beam splitter 433 and the second green beam splitter 435 sequentially, and mix with the green laser beams reflected by the second green beam splitter 435 together (shown in FIG. 2). The mixed laser beams can be modulated into images on a screen by a photoelectric conversion device (not shown).

According to the laser projection device 100 of this disclosure, because the laser beams emitted from the laser chips 21, 22, 23 are adjusted by the first group of beam splitters 41 and the second group of beam splitters 43 to be oriented toward the same direction and mixed together to obtain light of a predetermined color, the space between two adjacent laser chips can be further reduced.

Otherwise, because the laser beams emitted from the laser chips 21, 22, 23 are adjusted by two group beam splitters 41, 43, the first splitters 411, 413, 415 and the second splitters 431, 433, 435 are not need to be thinner and thinner, whereby the efficiency of assembling the laser projection device is increased.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A laser projection device comprising:
   a substrate;
   three laser chips mounted on the substrate, each laser chip being a laser diode;
   a spectroscope arranged on laser beams paths of the laser chips, the spectroscope comprising a first group of splitters and a second group of splitters spaced from the first group of splitters, laser beams emitted from the laser chips being adjusted into the second group of splitters by the first group of splitters, and then, the laser beams adjusted into the second group of splitters being adjusted to be oriented toward the same direction and mixed together to obtain light of a predetermined color;
   wherein the laser chips comprise a blue laser chip, a red laser chip and a green laser chip;
   wherein the first group of splitters comprises a first blue splitter, a first red splitter and a first green splitter, the second group of splitters comprises a second blue splitter, a second red splitter and a second green splitter, the blue laser beams emitted from the blue laser chip are reflected into the second blue splitter by the first blue splitter, the red laser beams emitted from the red laser chip are reflected into the second red splitter by the first red splitter, and the green laser beams emitted from the green laser chip are reflected by the first green splitter;
   wherein the first blue splitter, the first red splitter and the first green splitter are parallel to and spaced from each other;
   wherein the second blue splitter is parallel to and aligned with the first blue splitter, the second red splitter is parallel to and aligned with the first red splitter, and the second green splitter is parallel to and aligned with the first green splitter; and
   wherein a space between two adjacent first splitters is S1, a space between two adjacent second splitters is S2, and S2 is larger than S1.

2. The laser projection device of claim 1, wherein the laser chips are arranged in a line and the first group of splitters is aligned with the laser chips correspondingly.

3. The laser projection device of claim 2, wherein the first group of splitters and the second group of splitters are parallel to the arranged line of the laser chips.

4. The laser projection device of claim 1, wherein laser beams reflected into the second group of splitters are reflected by the corresponding second splitter to be oriented toward the same direction and mixed together to obtain light of a predetermined color.

5. A laser projection device comprising:
   a substrate;
   three laser chips mounted on the substrate, each laser chip being a laser diode; and
   a spectroscope arranged on laser beams paths of the laser chips, the spectroscope comprising a first group of splitters and a second group of splitters spaced from the first group of splitters, a space between two adjacent first splitters is S1, a space between two adjacent second splitters is S2, and S2 is larger than S1, laser beams emitted from the laser chips being adjusted into the second group of splitters by the first group of splitters, and then, the laser beams adjusted into the second group of splitters being adjusted to be oriented toward the same direction and mixed together to obtain light of a predetermined color.

* * * * *